(12) United States Patent
Stewart

(10) Patent No.: US 8,251,112 B1
(45) Date of Patent: Aug. 28, 2012

(54) SUBSTANTIALLY HELICAL, STEPPED BLADE ROW CUTTERHEAD HAVING REMOVABLE BLADE UNITS

(76) Inventor: John S. Stewart, Climax, NC (US)

( * ) Notice: Subject to any disclaimer, the term of this patent is extended or adjusted under 35 U.S.C. 154(b) by 0 days.

(21) Appl. No.: 12/773,391

(22) Filed: May 4, 2010

Related U.S. Application Data

(63) Continuation of application No. 11/604,420, filed on Nov. 27, 2006, now Pat. No. 7,708,038.

(51) Int. Cl.
*B27C 1/00* (2006.01)

(52) U.S. Cl. ............... 144/117.1; 144/218; 144/221; 144/230

(58) Field of Classification Search ............ 144/117.1, 144/118, 221, 231, 218; 407/294; 241/113, 241/114, 116, 15, 31, 35, 37, 40, 42, 46, 241/48, 53, 55, 59, 63, 206
See application file for complete search history.

(56) References Cited

U.S. PATENT DOCUMENTS

| | | | | |
|---|---|---|---|---|
| 3,587,151 A * | 6/1971 | Nystrom | ............ | 407/31 |
| 3,715,788 A * | 2/1973 | Ayer | ............ | 407/37 |
| 4,074,737 A * | 2/1978 | Stewart | ............ | 144/117.1 |
| 4,569,619 A * | 2/1986 | Newton | ............ | 407/15 |
| 4,790,693 A * | 12/1988 | Koblesky | ............ | 407/35 |
| 4,830,073 A * | 5/1989 | De Abreu | ............ | 144/221 |
| 5,002,104 A * | 3/1991 | Stewart | ............ | 144/230 |
| 5,052,863 A * | 10/1991 | Satran | ............ | 407/113 |
| 5,083,887 A * | 1/1992 | Dotany | ............ | 407/59 |
| 5,603,365 A | 2/1997 | Stewart | ............ | 144/230 |
| 5,630,681 A * | 5/1997 | Paya | ............ | 407/114 |
| 5,647,419 A | 7/1997 | Stewart | ............ | 144/230 |
| 5,653,275 A | 8/1997 | Stewart | ............ | 144/373 |
| 5,738,156 A | 4/1998 | Stewart | ............ | 144/373 |
| 5,947,649 A * | 9/1999 | Arai et al. | ............ | 407/34 |
| 6,659,694 B1 * | 12/2003 | Asbell et al. | ............ | 407/40 |
| 7,090,444 B1 * | 8/2006 | Craig | ............ | 407/113 |

OTHER PUBLICATIONS

Helical Cutter Head, 2-page brochure from Yun An Works, Co., Ltd., May 2003.
Tools and Components for the Woodworking Industry catalog, 21 printed pages from Byrd Tool Corp., Jan. 1, 2005.

* cited by examiner

*Primary Examiner* — David Walczak
*Assistant Examiner* — Jennifer C Chiang
(74) *Attorney, Agent, or Firm* — MacCord Mason PLLC

(57) ABSTRACT

A cutterhead for a peripheral milling machine including a cutterhead body including a generally cylindrical portion and a plurality of circumferential, spaced and offset blade unit mounting cavities extending into the cutterhead body from the periphery of the cylindrical portion for receiving a blade unit. The cutterhead further includes a plurality of blade units each having at least one cutting edge and means for removably securing each of the removable blade units in the corresponding blade unit mounting cavity. The cutting edge of each of the blade units is disposed to align with the cutting edge of each of the other blade units in adjacent mounting cavities to form a substantially helical, stepped blade row when the blade units are secured to the cutterhead body.

40 Claims, 12 Drawing Sheets

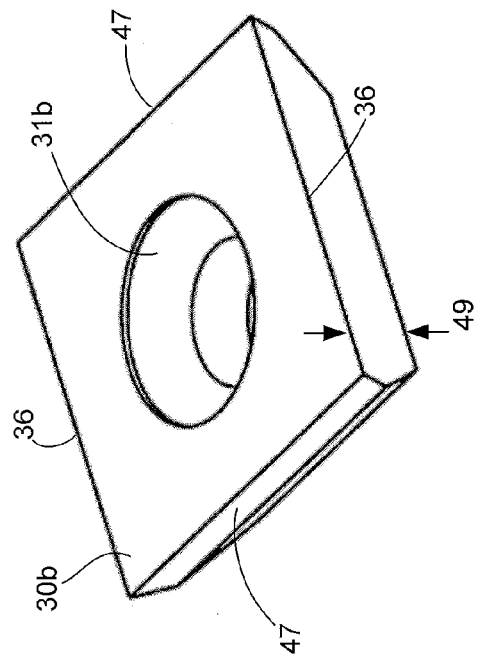
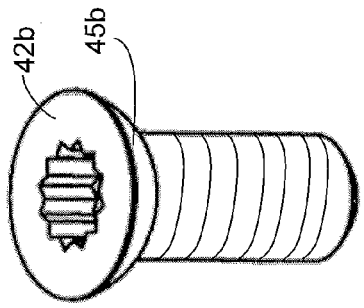
FIGURE 5
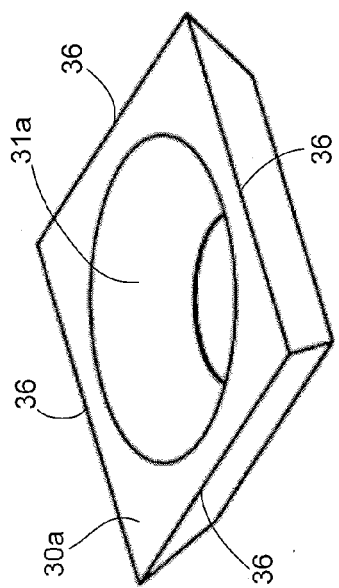
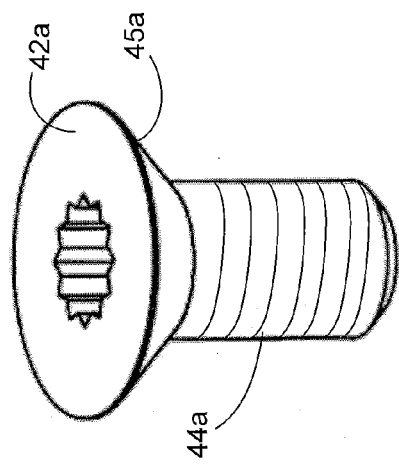
FIGURE 4

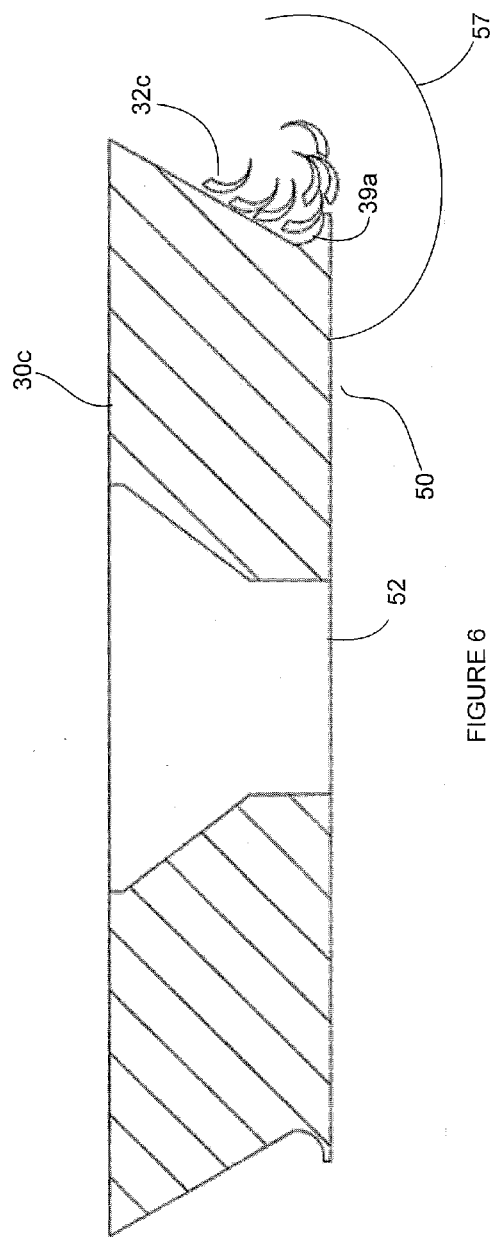
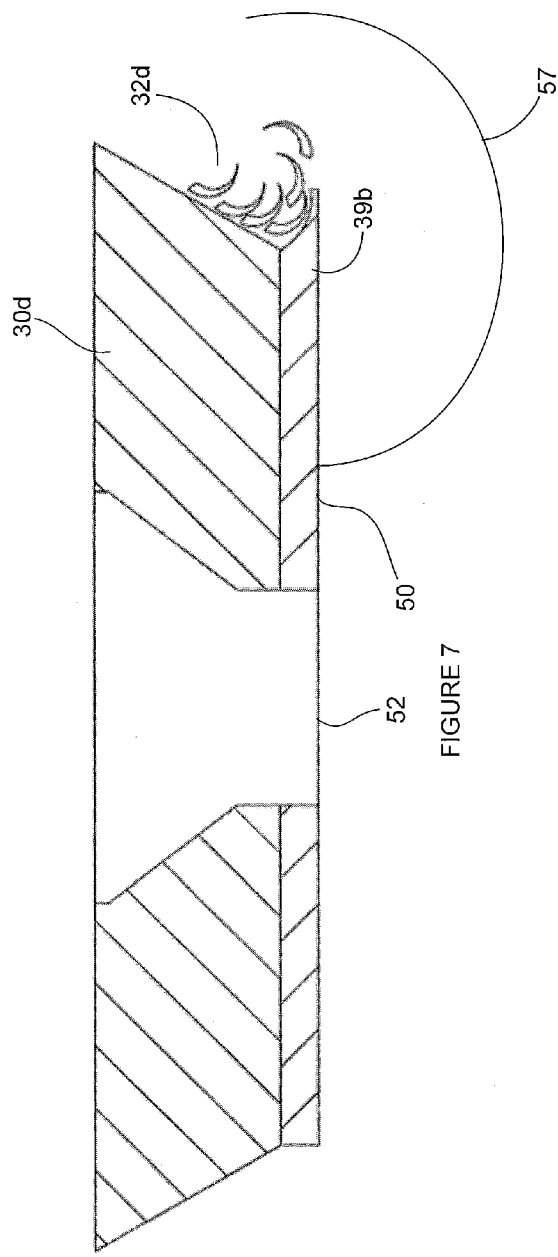
FIGURE 6
FIGURE 7

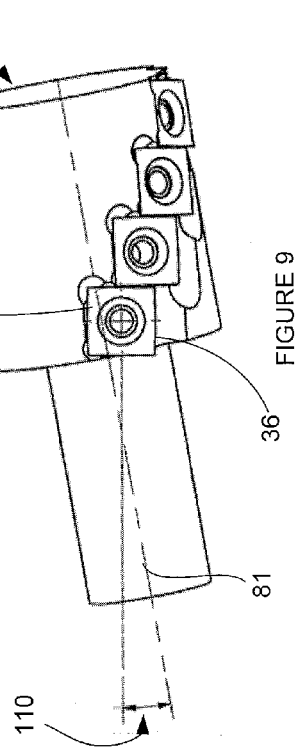
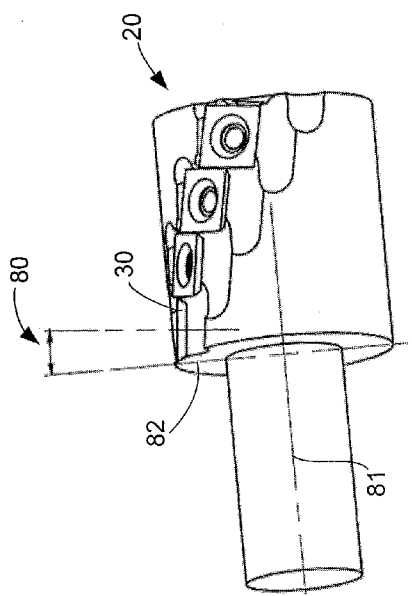
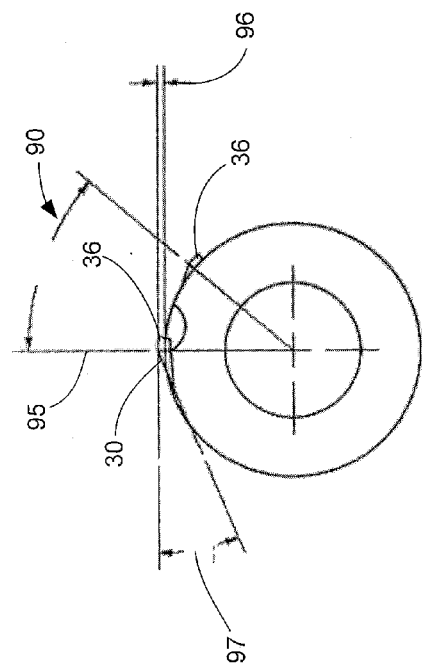

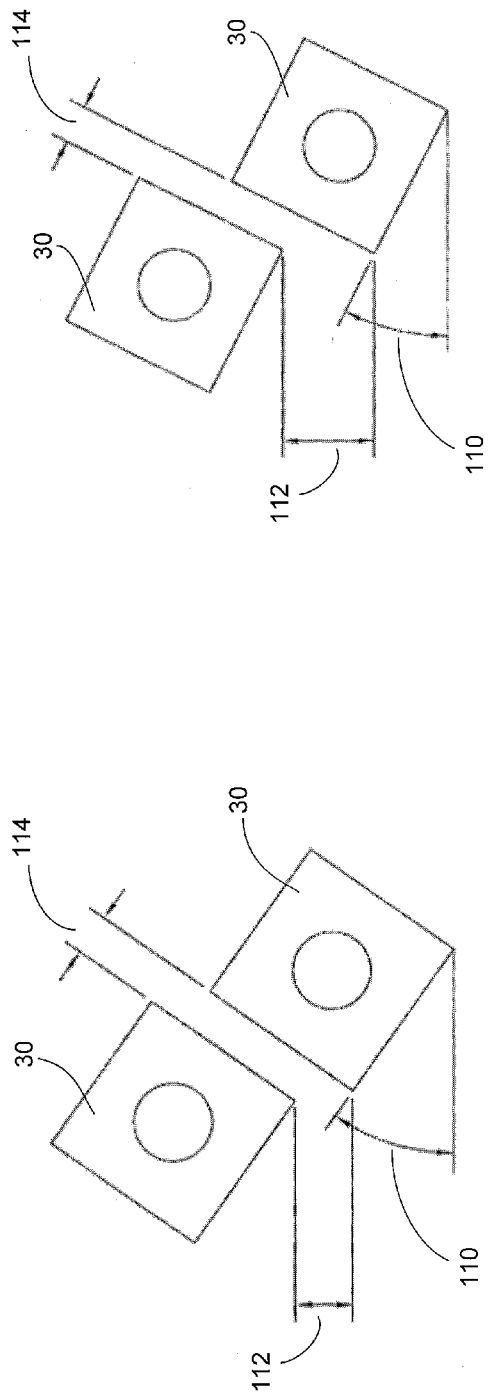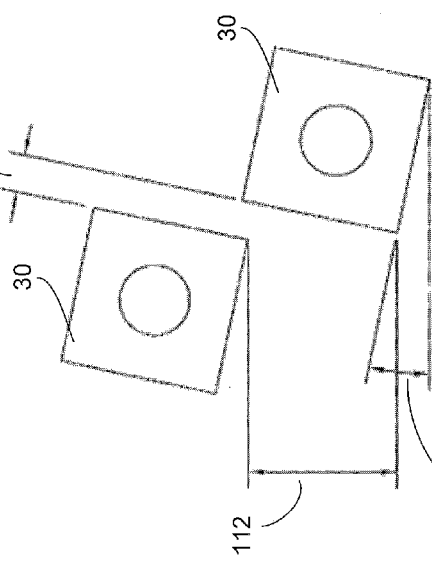

SUBSTANTIALLY HELICAL, STEPPED BLADE ROW CUTTERHEAD HAVING REMOVABLE BLADE UNITS

CROSS-REFERENCE TO RELATED PATENTS

The present disclosure is a continuation application of commonly owned U.S. patent application Ser. No. 11/604,420 filed Nov. 27, 2006, titled "Substantially Helical, Stepped Bland Row Cutterhead Having Removable Blade Units," now U.S. Pat. No. 7,708,038 issued May 4, 2010.

BACKGROUND (1) Field of the Invention

The present invention relates generally to cutterheads for peripheral milling machines, which includes surfacers, planers, molders, joiners and similar machines, and, more particularly, to a substantially helical, stepped blade row cutterhead having removable blade units.

(2) Description of the Prior Art

The present invention relates to improvements in cutterheads, particularly cutterheads such as those shown in the applicant's commonly owned U.S. Pat. Nos. 4,074,737, 5,002,104, 5,653,275, 5,603,365, 5,647,416, and 5,738,156, the entire disclosures of which are incorporated herein by reference in their entirety.

Helical cutterheads for peripheral milling machine that have particular pitch arrangements reduce the noise generated by the cutterhead while planing a workpiece. These cutterheads generally have a plurality of segmented cutterhead inserts, each of which includes a cutting blade mounted in cooperating or receiving grooves in the cutterhead body. In a typical arrangement, the cutterhead inserts span about one inch along the cutterhead length. The cutterhead inserts are securely mounted in the grooves to form substantially continuous blade rows. The contour of the actual cutting edge of the blade rows preferably follows the contour of the helical groove in the cutterhead.

In one embodiment described in the above patents, the cutterhead inserts have carbide cutting blades brazed or welded to them. The carbide blade, after brazing to the cutterhead insert, is subsequently ground to obtain a helical geometry in keeping with the entire helix of the cutterhead. When the cutting blade is worn out, the entire cutterhead insert must be replaced or returned to a tool shop for re-tipping and regrinding.

In the prior art cutterheads, the brazing method of attachment limits the materials that can be used as the cutting blades to those that can withstand brazing, such as conventional carbide. However, more advanced cutting materials including diamonds, ceramics, coated materials, high cobalt alloys, etc. would be difficult to braze and impractical to use as the entire cutterhead insert. The other patents teach various ways to provide removable blade units to in order to eliminate the need for brazing and simplify the re-tipping process, which requires a high degree of skilled labor.

Thus, there still remains a need for an improved cutterhead that permits other blade materials to be used to form the cutting edge while, at the same time, reduces maintenance by eliminating regrinding and providing for simple blade unit replacement as they are worn or damaged.

SUMMARY OF THE INVENTION

This disclosure describes a cutterhead for a peripheral milling machine. The cutterhead includes a cutterhead body including (a) a generally cylindrical portion and (b) a plurality of circumferential, spaced and offset blade unit mounting cavities extending into the cutterhead body from the periphery of the cylindrical portion for receiving a blade unit. The cutterhead further includes a plurality of blade units each having at least one cutting edge and means for removably securing each of the removable blade units in the corresponding blade unit mounting cavity. The cutting edge of each of the blade units is disposed to align with the cutting edge of each of the other blade units in adjacent mounting cavities to form a substantially helical, stepped blade row when the blade units are secured to the cutterhead body. In an embodiment, the blade unit mounting cavities are offset and overlapped. The minimum offset to provide an overlapping corner of an adjacent blade unit cutting edge is a function of the shear angle orientation of the blades and the geometry of the blade units whereby each helical stepped blade row makes a full cut.

The minimum offset of the blade units may be calculated according to the function Minimum Offset equals (w')(tangent (90°−shear angle°)); where w' is the blade unit width dimension and the shear angle is the angle formed by the blade unit and the rotational axis of the cutterhead. The cutterhead body may further include a chip deflector, which may be integrated into the blade unit, or, alternatively, be a separate plate located in the blade mounting cavity beneath the blade and the cutterhead may be made of steel, aluminum or similar materials.

The blade unit mounting cavities may extend into the cutterhead body from the periphery of the cylindrical portion for receiving a blade unit and further include a corner relief. Also, the cavities may include a tilt angle, calculated to minimize the error in fit to the desired helical cure, and by a roll angle, which determines the offset of the front face of a given blade unit with respect to the front face of an adjacent blade unit.

The apparatus may further include means for removably securing each of the removable blade units in the corresponding blade unit mounting cavity and each of the blade unit mounting cavities may include a hole to receive the means for removably securing a blade unit in its respective mounting cavity. The means for removably securing the blade unit in its respective mounting cavity may be a fastener, which may be a threaded fastener, and the hole in the blade unit may be countersunk.

Furthermore, each of the mounting cavities may include at least one raised portion and each of the blade units have at least three sides and at least one side that abuts the raised portion of a blade unit mounting cavity and the blade units may have four cutting edges. In addition, the holes for the threaded fasteners may be offset to provide mating of the blade units with the raised portion of the mounting cavities and to provide that cutting forces act on the raised portion of the mounting cavities and not on the fasteners, thereby helping to prevent failure of the fasteners and movement of the blade unit.

The blade units may be inverted truncated pyramids having a thickness of preferably less than about 10 mm and the cutting faces of the blade units may be radiused to conform more closely to the approximated helical curve. Also, the cutting edge of each of the blade units may be raised to facilitate jointing, and each of the mounting cavities may include a dimple or recess with each of the blade units including a mating dimple or recess.

The blade units may be made of materials selected from the group consisting of diamond, ceramic, carbide, high cobalt alloys, and high speed steel and mixtures thereof, and they may be coated, implanted or deposited to reduce wear using techniques including growth of CVD and PVD diamond films, titanium nitride and similar coatings, and may also be hardened using heat treatments or cryogenic treatments.

Accordingly, one aspect of the present invention is to provide a cutterhead for a peripheral milling machine. The cutterhead includes a cutterhead body including (a) a generally cylindrical portion and (b) a plurality of circumferential, spaced and offset blade unit mounting cavities extending into the cutterhead body from the periphery of the cylindrical portion for receiving a blade unit. The cutterhead further includes a plurality of blade units each having at least one cutting edge. Each cutting edge of each of the blade units is disposed to align with the cutting edge of each of the other blade units in adjacent mounting cavities to form a substantially helical, stepped blade row when the blade units are secured to the cutterhead body.

Another aspect of the present invention is to provide a cutterhead body for a cutterhead for a peripheral milling machine having a plurality of blade units each having at least one cutting edge. The cutterhead body includes a generally cylindrical portion and a plurality of circumferential, spaced and offset and overlapped blade unit mounting cavities extending into the cutterhead body from the periphery of the cylindrical portion for receiving a blade unit. The cutting edge of each of the blade units is disposed to align with the cutting edge of each of the other blade units in adjacent mounting cavities to form a substantially helical stepped blade row when the blade units are secured to the cutterhead body and the minimum offset to provide an overlapping corner of an adjacent blade unit cutting edge is a function of the shear angle orientation of the blades and the geometry of the blade units whereby each helical stepped blade row makes a full cut.

Still another aspect of the present invention is to provide a cutterhead for a peripheral milling machine. The cutterhead includes a cutterhead body including (a) a generally cylindrical portion and (b) a plurality of circumferential, spaced and offset and overlapped blade unit mounting cavities extending into the cutterhead body from the periphery of the cylindrical portion for receiving a blade unit. The cutterhead further includes a plurality of blade units each having at least one cutting edge and means for removably securing each of the removable blade units in the corresponding blade unit mounting cavity. The cutting edge of each of the blade units is disposed to align with the cutting edge of each of the other blade units in adjacent mounting cavities to form a substantially helical stepped blade row when the blade units are secured to the cutterhead body and the minimum offset to provide an overlapping corner of an adjacent blade unit cutting edge is a function of the shear angle of the helical stepped blade row edge and the geometry of the blade units whereby each helical stepped blade row makes a full cut.

These and other aspects of the present invention will become apparent to those skilled in the art after a reading of the following description of the preferred embodiment when considered with the drawings.

BRIEF DESCRIPTION OF THE DRAWINGS

FIG. 4 is a top perspective view of an embodiment of a fastener and blade combination;

FIG. 5 is a top perspective view of another embodiment of a fastener and blade unit combination;

FIG. 6 is a side cross-sectional view of another embodiment of a blade unit;

FIG. 7 is a side cross-sectional view of another embodiment of a blade unit;

FIG. 8 is an enlarged side view of the end portion of the cutterhead;

FIG. 9 is an enlarged top view of the end portion of the cutterhead;

FIG. 10 is an enlarged end view of the end portion of the cutterhead;

FIGS. 11(a), (b) and (c) are schematics illustrating the relative positioning of blade units at various shear angles for achieving an overlap cut;

DESCRIPTION OF THE PREFERRED EMBODIMENTS

Figure 1:
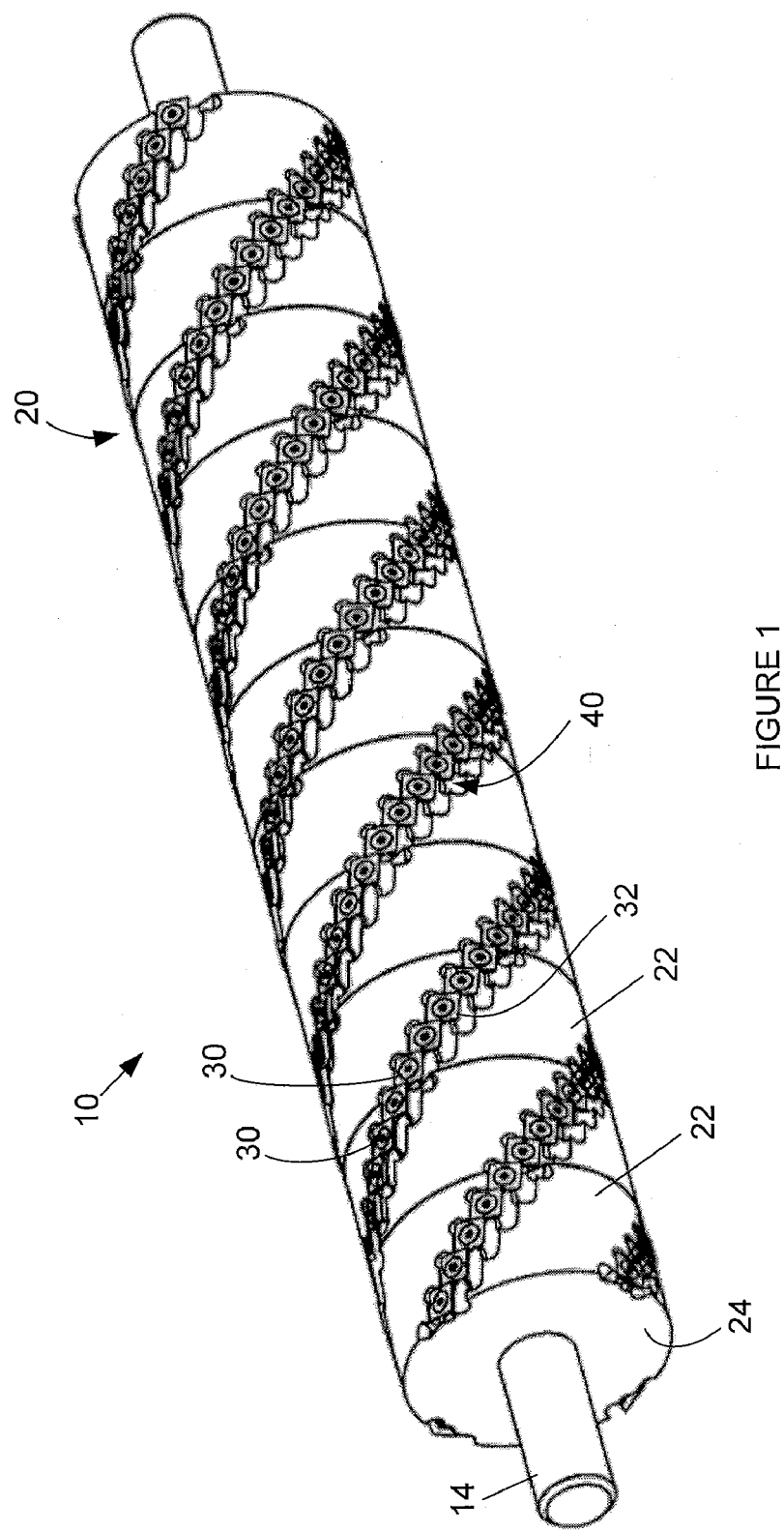
FIG. 1 is a front perspective view of a cutterhead for a peripheral milling machine constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, the illustrations are for the purpose of describing embodiments of a cutterhead and are not intended to limit the invention thereto. FIG. 1 shows a cutterhead 10 for a peripheral milling machine. The cutterhead 10 includes a cutterhead body 20 that can be constructed from steel, aluminum or similar materials and include one or more body units 22, each of which includes a generally cylindrical portion 24 and a plurality of blade units 30. Each of the blade units 30 includes a cutting edge 32 disposed with respect to a cutting edge 32 of adjacent blade units 30 to form a substantially helical, stepped blade row 40 with blade units 30 in well defined rows with minimum offset between blade units 30 to produce planer marks similar to those produced by conventional cutterheads and permit large numbers of rows for high-speed applications of the cutterhead 10. With the body units 22 aligned axially on an arbor 14, the substantially helical, stepped blade row 40 can extend from body unit 22 to adjacent body unit 22, as shown in FIG. 1. Blade unit 30 positioning is calculated to provide a "best-fit" helical curve.

Figure 2B:
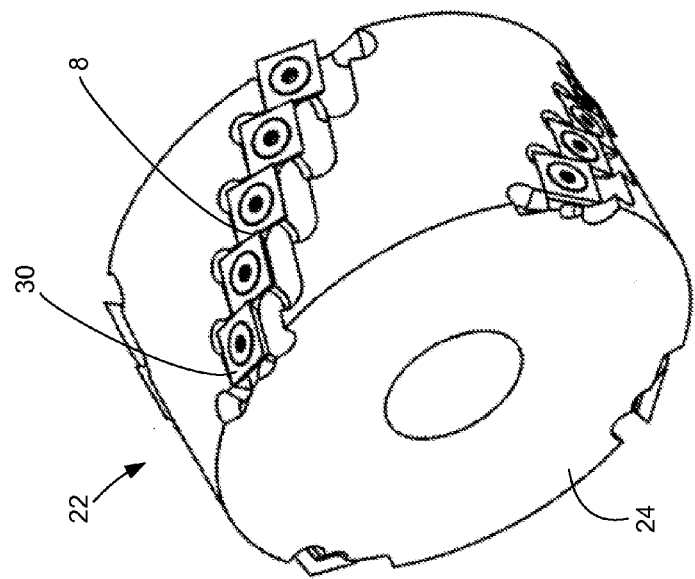
FIG. 2b is an enlarged front perspective view of a portion of the cutterhead of FIG. 1 with the blade units attached.
Figure 2A:
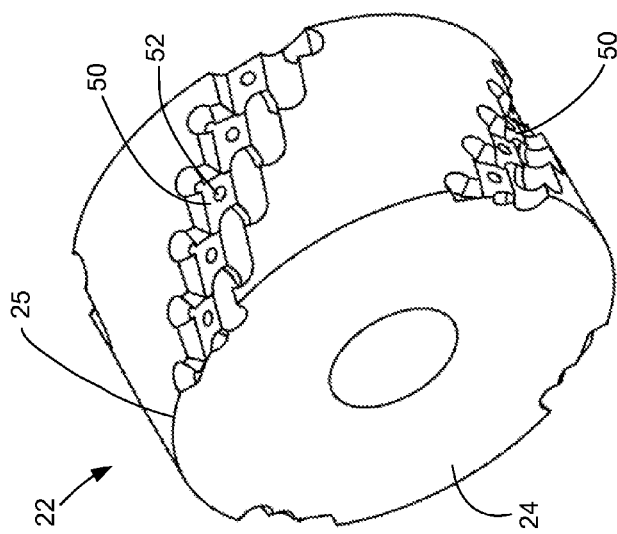
FIG. 2a is an enlarged front perspective view of a portion of the cutterhead of FIG. 1 with the blade units removed.

FIGS. 2A and 2B show a body unit 22 that includes a plurality of circumferential, spaced and offset blade unit mounting cavities 50 extending into the unit 22, and thus, the cutterhead body 20, from the periphery 25 of the generally cylindrical portion 24 of the unit 22. Each of the blade unit mounting cavities 50 includes a hole 52 for receiving a fastener for securing a blade unit 30 in the mounting cavity 50 to provide an overlapping corner 8. The body unit 22 shown can be used alone or in combination with other, similar body units to form the cutterhead 10 having four blade rows 40, although only one is required to make a complete cut.

Figure 3:
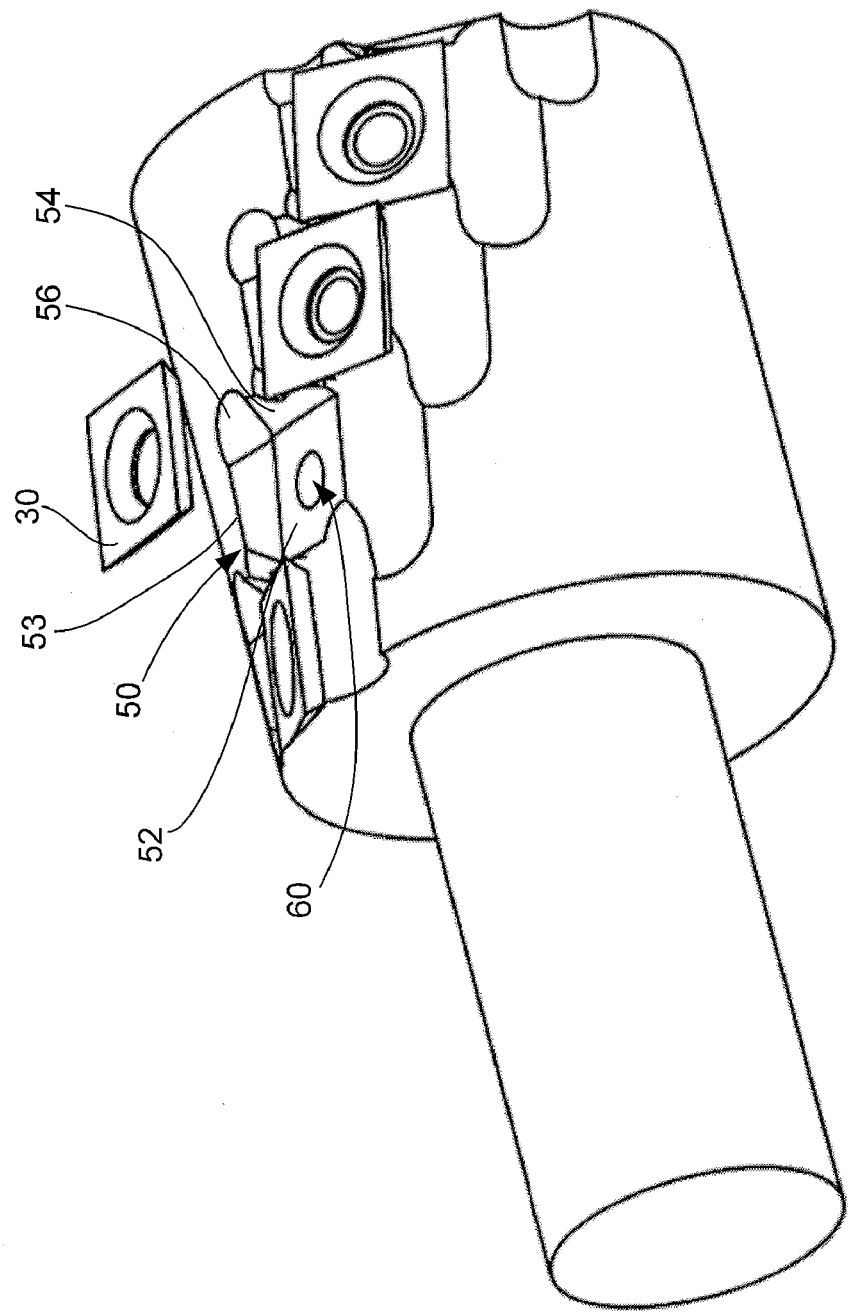
FIG. 3 is enlarged view of the end portion of the cutterhead.

FIG. 3 shows a mounting cavity 50 including a flat seat area 52 and raised portions 53 and 54 along a back and side of the cavity 50, respectively. The mounting cavity 50 shown also includes optional depressions 56 that provide blade unit corner relief. In addition, the hole 60 may be offset to provide mating of the blade unit 30 with the raised portions 53 and 54 of the mounting cavities. Also, the cavity 50 may have a recess or dimple for mating with a dimple or recess in a blade unit.

FIG. 4 shows an embodiment of the blade unit 30(a) in the shape of an inverted truncated pyramid and a mating fastener 42(a) for securing the blade unit 30 in one of the mounting cavities shown in FIG. 2. The fastener 42(a) includes a threaded rod 44(a) below a flange 45(a) shaped to seat within a mating cavity 31(a) in the blade unit 30(a) to countersink the fastener flange 42(a). Any one of four cutting edges 36 can be rotated to form a portion of the substantially helical, stepped blade row 40 shown in FIG. 1.

FIG. 5 shows an alternative embodiment of the blade unit 30(b) and fastener 42(b) shown in FIG. 4. This unit 30(b) and fastener 42(b) combination is designed for especially high impact applications of the cutterhead 10, and thus includes two opposing cutting edges 36 and two dubbed off edges 47. Alternative screw design 42(b) removes less cross-sectional area for the countersink 31(b) in blade unit 30(b), which thereby strengthens the blade unit 30(b) and improves its breakage resistance. The flange 45(b) mates with the mounting cavity 31(b) to increase the strength of the fastener 42(b) and blade unit 30(b) combination. This fastener 42(b) and unit 30(b) combination also increases the strength of the corners of the unit 30(b) versus that of FIG. 4 by eliminating the compound angles required in the corners of the embodiment of the unit 30(a) shown in FIG. 4.

Alternative embodiments for increasing the impact resistance of the blade units include combinations of the screw design, rounding of the corners and dubbing or flattening of opposite sides of the blade units 30 to form two sided blade units. The blade units 30 may include materials such as diamond, ceramic, carbide, high cobalt alloys, high speed steel and mixtures thereof, and the thickness 49 of the blade units 30(a) and 30(b) may preferably be less than about 5 mm.

FIGS. 6 and 7 show the typical work piece chip flow from the cutting edges 32(c) and 32(d) of blade units 30(c) and 30(d), respectively, into chip gullet areas 57 associated with each of the mounting cavities 50 shown in FIG. 2. In the embodiments shown in FIGS. 6 and 7, each of the blade units 30(c) and 30(d) includes a chip deflection device 39(a) and 39(b) to prevent wear in the chip gullet areas 57 that would otherwise be caused by the chip flow, especially in high-speed applications of the cutterhead. The device 39(a) is molded into the blade unit 30(c) whereas the blade unit 30(d) includes a separable deflection plate 39(b) in the seat area 52 of the blade unit cavity 50.

FIG. 8 shows the tilt angle 80 of the blade units 30 with respect to an axis 82 perpendicular to the axis 81 of rotation of the cutterhead body 20. The tilt angle is calculated to compensate for geometry errors due to the shear angle. Preferably, the tilt angle 80 is between about 2 and 5 degrees. For applications where a relatively small diameter cutterhead body 20 is desirable, the tilt angle 80 may be larger, up to 20 degrees.

FIG. 9 shows the shear angle 110 of a blade unit 30, which is the angle that is formed between the axis of rotation 81 of the cutterhead 10 and a cutting edge 36. Although it is possible to use the cutterhead with a blade unit 30 shear angle of 0°, increasing the shear angle 110 results in more continuous cutting forces, which reduce noise, vibration, blade unit edge wear and improves surface quality.

FIG. 10 shows the roll angle 90 of the blade units 30, which is the angle formed by the offset of one cutting edge 36 with respect to the adjacent cutting edge 36. The offset provides improved workpiece chip breaking by producing shorter chips than a conventional helical cutterhead, which increases the efficiency of the chip collection system of the peripheral milling machines since longer chips tend to clog the chip collection tubes. The figure also shows the tip projection 96 and clearance angle 97 for a unit 30. The tip projection 96 is the radial distance that the cutting edge 36 of a unit 30 extends beyond the generally cylindrical portion of the cutterhead body 20. A larger tip projection 96 permits higher feed rates, increased depths of cut, and facilitates honing (jointing) of the cutting edges 36 to increase cutting efficiency after the edges become worn. The clearance angle 97 is the angle between a line parallel to the top surface of the blade unit 30 and a line perpendicular to the vertical axis 95 when the blade unit cutting edge 36 is positioned on the vertical axis 95. Generally, an increase in the clearance angle may reduce surface defects and also aids in jointing of the blade cutting edges 36 when needed.

FIGS. 11(a), 11(b) and 11(c) show schematically the relative positioning of blade units 30 required to achieve an overlap cut, which results when one area of the work piece is machined by each of two adjacent blade units 30. This overlap provides that a completed cut is taken by a single knife row. Because the geometry of the corners of the units may make them susceptible to breakage, an overlap cut provides a greater likelihood that corresponding areas of the work piece will be machined when adjacent blade units 30 have broken corner areas. As the shear angle 110 decreases, the offset 112 between adjacent units 30 must be increased or the distance 114 between blade units 30 decreased to maintain an overlap cut. Since the distance 114 is preferably held to a minimum in the present inventions, this generally results in an increase in the offset. However, the figure shows the relative positioning of the blade units 30 in two dimensions. When the blade units 30 are mounted in the cavities of a cutterhead body, of course, the radius of the generally cylindrical portion introduces a third dimension to the relationship that is not depicted by the figure, but the relationship between the blade units 30 in the two dimensions shown remains.

FIG. 11 also illustrate how the present inventions improve blade unit cutting edge life. The shear angle provides improvements in edge life over conventional straight blade units by reducing the fluctuating (impulsive) forces acting on the cutting edge. This reduces the micro-chipping wear of the edge associated with the normal machining process and results in significant increases in edge life. Indexible blade units typically have weakened corners resulting from multiple cutting edges, which often break or chip before the blade unit would otherwise be taken out of service. This results in reduced blade unit life due to only two opposite sides (for a blade with four edges) are useable. The overlap utilized in the current inventions, as illustrated in FIG. 11, provides protection for the trailing corner and results in a double cut in the overlap zone. These features, acting together, usually results in defect free cutting if either one of the corners is chipped or damaged, which usually allows all four edges to be used for their normal life. For high impact high breakage applications, this may result in as much as a doubling of total blade unit life.

Figure 12:
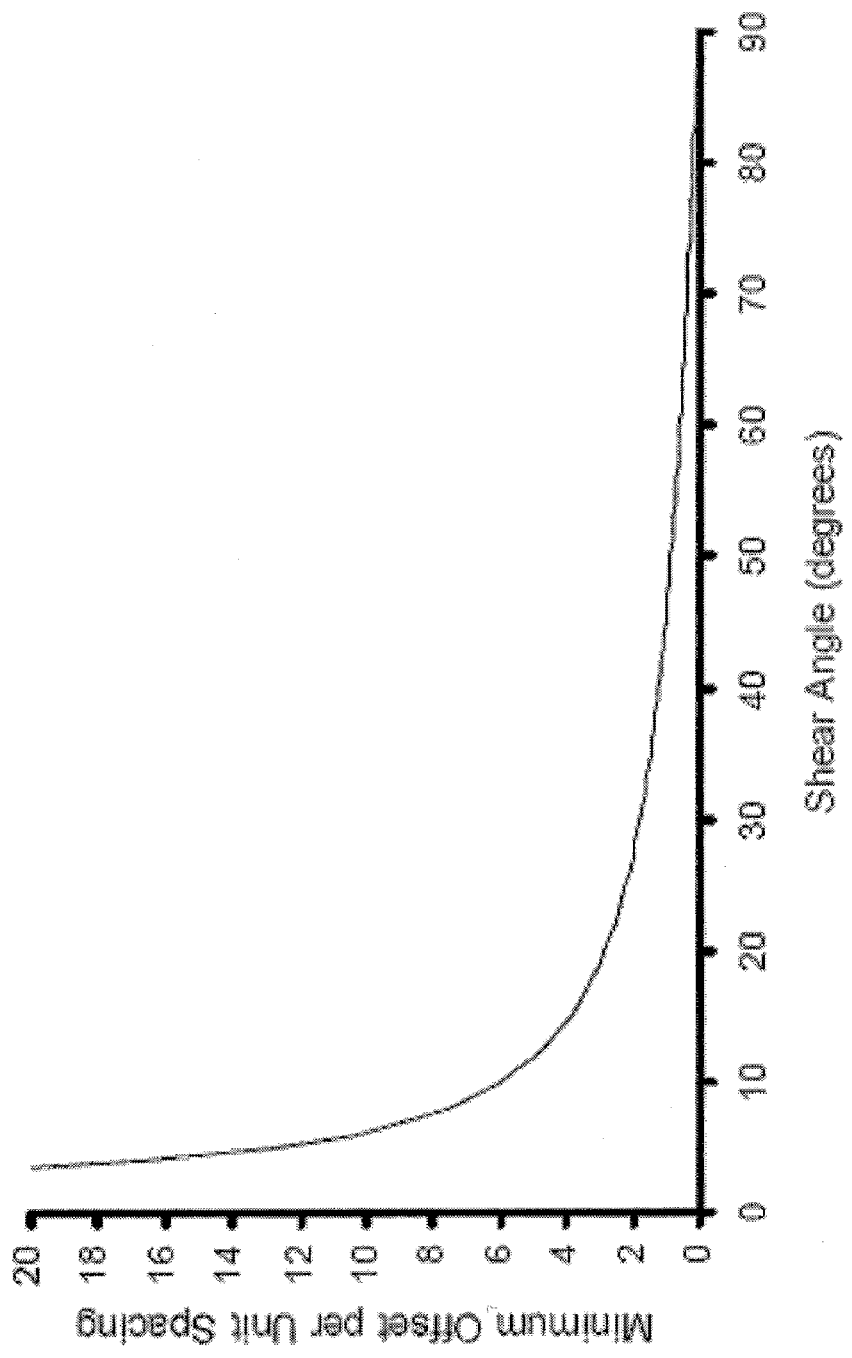
FIG. 12 is a graphical representation of the Minimum Blade Unit Offset per Blade Unit Spacing versus the Shear Angle of a Blade Unit.

FIG. 12 is a graph showing the relationship between the Shear Angle of the Blade Units and the Minimum Blade Unit Offset per Unit Spacing between the blade units. As can be seen, the minimum offset to provide an overlapping corner 8 of the blade units follows the function Minimum Offset equals (w')(tangent (90°−shear angle°)); where w' is the blade unit width dimension and the shear angle is the angle formed by the blade unit and the rotational axis of the cutterhead.

Figure 13A:
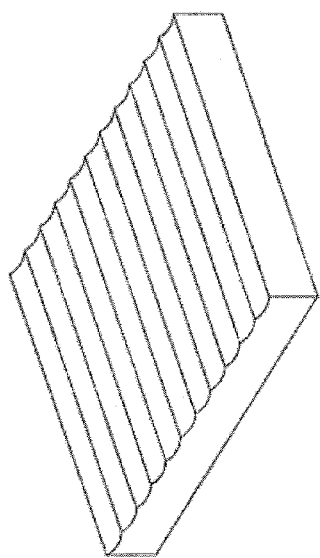
FIGS. 13(a), (b) and (c) illustrate the surface marks of work pieces depending on the arrangement of the blade units.
Figure 13B:
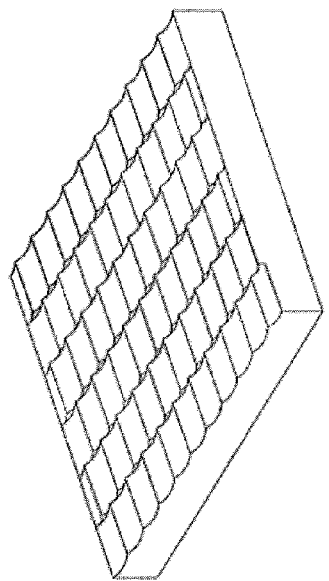
Figure 13C:
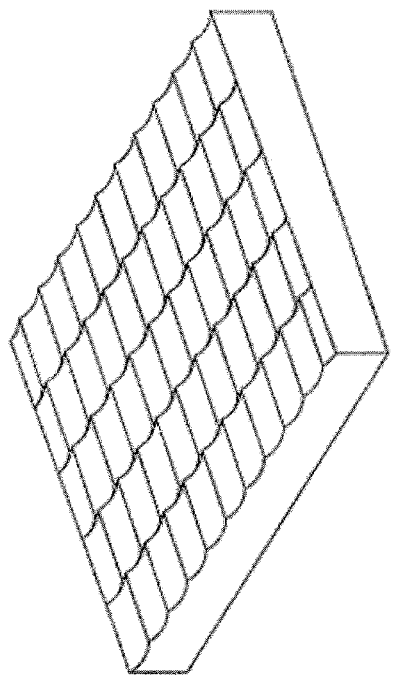

FIGS. 13(a), (b) and (c) are illustrations of surface marks expected to be produced in workpieces by peripheral milling machine operations using various cutterheads. FIG. 13(a) shows the surface marks produced by a true continuous helical cutterhead blade, which are similar to conventional straight knife head cutter marks. FIG. 13(b) shows the irregular surface marks produced by a conventional stagger tooth cutterhead. FIG. 13(c) shows the surface marks of the substantially helical, stepped blade row cutterhead having removable blade units of the present inventions. As can be seen, these surface marks more closely resemble those of a true continuous helical cutterhead shown in FIG. 13(a), than do the marks left by a conventional stagger tooth cutterhead in FIG. 13(b). This type of surface finish is more commercially desirable for many applications.

Figure 14:
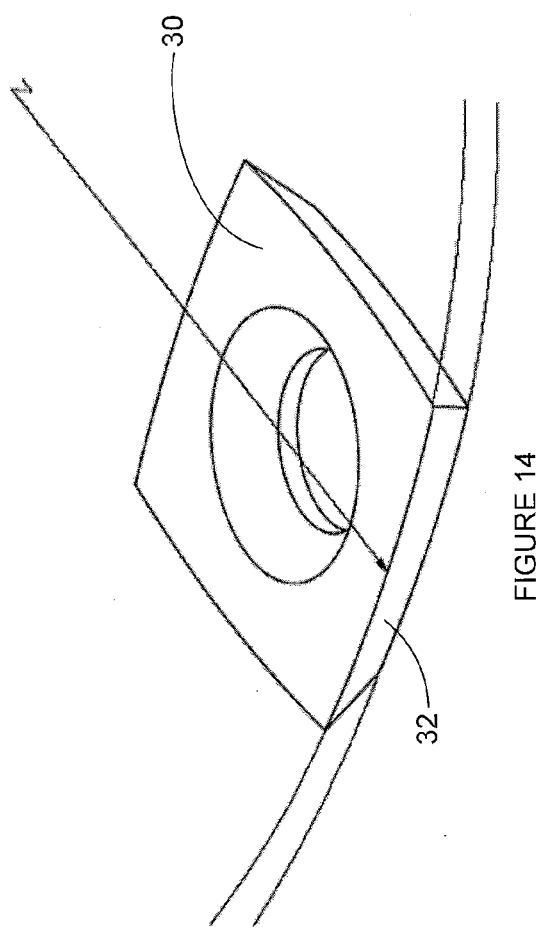
FIG. 14 shows a blade unit having curved faces.

FIG. 14 shows a blade unit 30 including four cutting faces 32 having a radius of curvature of about 150 mm.

Figure 15:
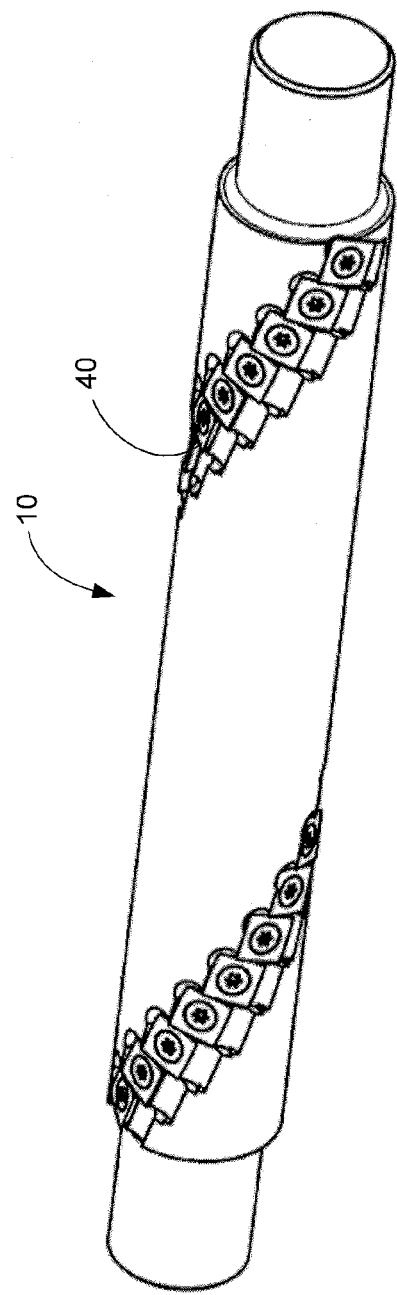
FIG. 15 shows an alternative embodiment of a cutterhead having a single blade row.

FIG. 15 shows an alternative embodiment of a cutterhead 10 having a single blade row 40.

Figure 16:
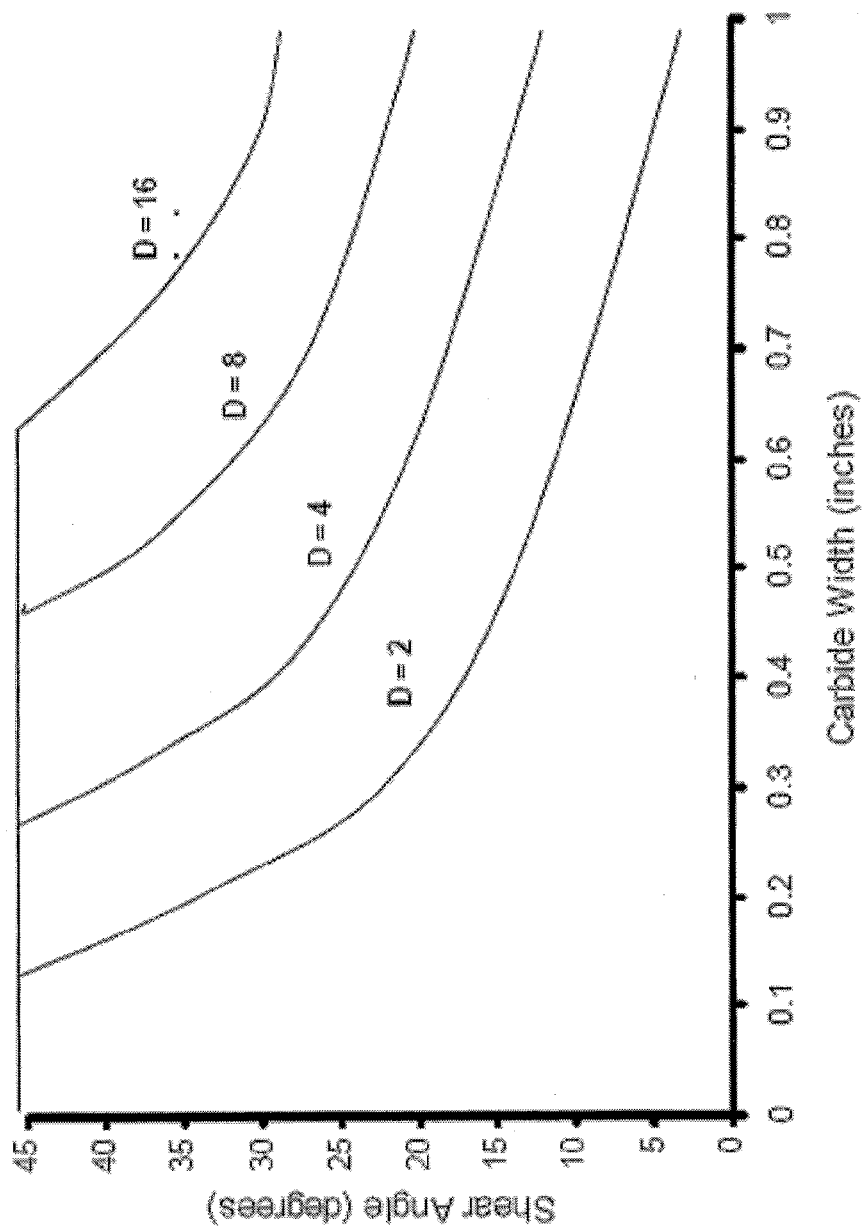
FIG. 16 is a graphical representation of the Maximum Shear Angle versus the Width of a Blade Unit.

FIG. 16 is a graphical representation of the Maximum Shear Angle versus the Width of a Blade Unit for several cutterhead diameters (D).

Figure 17:
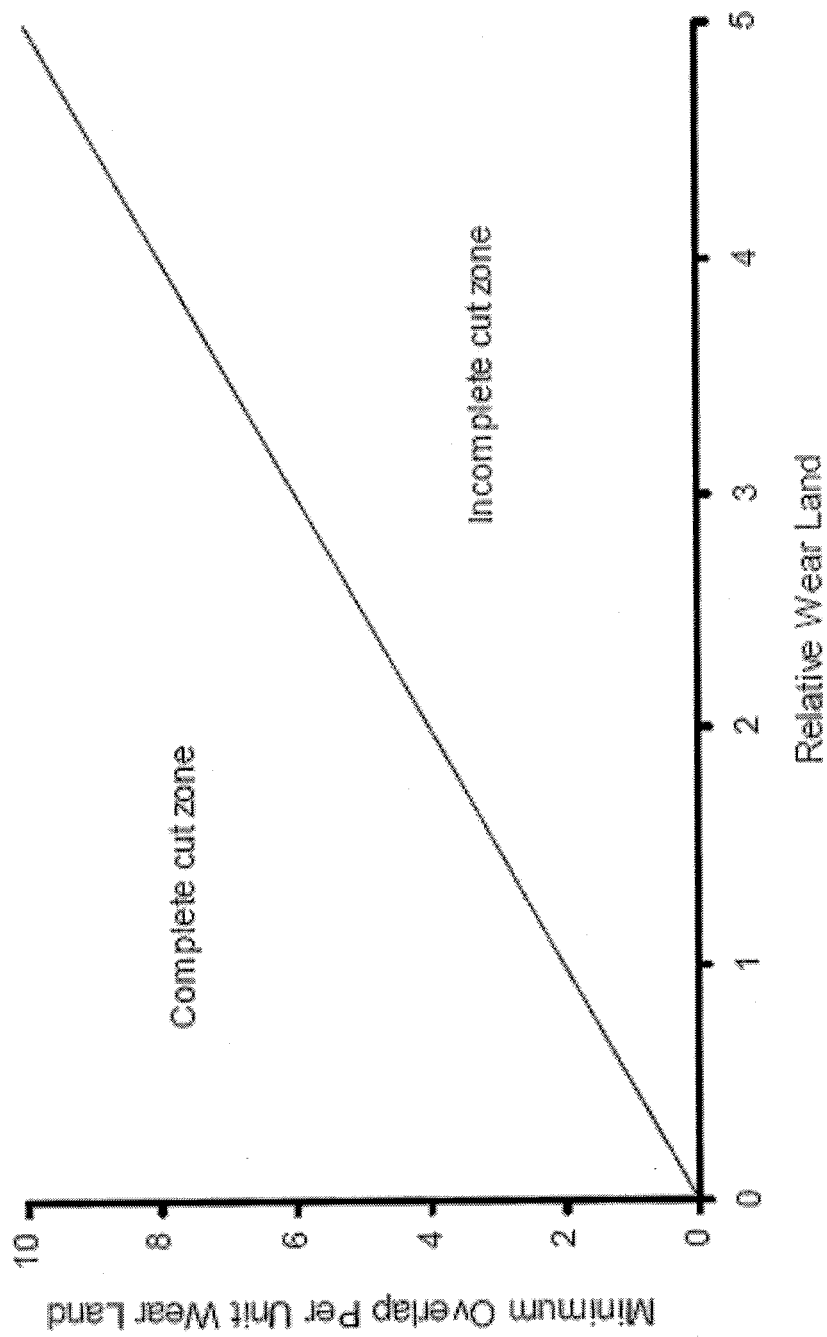
FIG. 17 is a graphical representation of the Minimum Required Overlap per Unit Wear Land.

FIG. 17 is a graphical representation of the Minimum Overlap Required per Unit Wear Land to insure a complete cut.

Certain modifications and improvements will occur to those skilled in the art upon a reading of the foregoing description. By way of example, other known types of chip management and tear out control could be utilized. Also, different orientations of the shear cutting faces with respect to the axis of rotation may be used to improve chip collection and improve workpiece edge quality. These variations include right hand shear geometry, left hand shear geometry, and compression shear geometry. The importance of these configurations is due to the opposite directions of chip flow for right and left hand shear cutting (which affects chip collection efficiency) and the effect of shear angle orientation on workpiece edge tearout (chipping, splintering, etc.).

For surfacing applications using either a right hand or left hand shear orientation, the forces acting on the edges of a workpiece are "into" the workpiece edge on one side of the workpiece (which reduces chipping) and "off" the edge for the other side of the workpiece (which increases chipping). These problems are exaggerated for higher shear angles. The compression design, which is used for applications involving a specific range of workpiece widths, may incorporate a left hand shear on one end of the cutter and a right hand shear on the other end of the cutter so as to achieve "into" the edge cutting on both sides of the workpiece, thereby reducing workpiece damage.

Furthermore, the blade units may also be coated, implanted or deposited on the rake or clearance face with additional wear resistant materials so as to promote a differential wear rate between the rake and clearance faces, which results in a "self sharpening" effect. The use of coatings and other wear resistant technologies can also be used to reduce incidental wear occurring on blade unit edges, which are not associated with the cutting action due to the flow of chips.

Finally, the cutterhead may contain a large number of blade rows to accommodate high speed applications. This may also incorporate profiling blade units that are located in mounting cavities machined into the sides of the cutterhead body and may be adjusted for profile width by the addition or removal of shims between the blade unit and the seat of the mounting cavity. All such modifications and improvements have not been included herein for the sake of conciseness and readability but are properly within the scope of the following claims.

I claim:

1. A cutterhead for a peripheral milling machine, said cutterhead comprising:
   (a) a cutterhead body including (i) a generally cylindrical portion and (ii) a plurality of circumferential, spaced and offset blade unit mounting cavities extending into the cutterhead body from the periphery of the cylindrical portion in a helical arrangement for receiving a blade unit; and
   (b) a plurality of blade units each having at least one cutting edge aligning in said helical arrangement to form a substantially continuous helical cutting edge,
   whereby said cutting edge of each of said blade units is disposed to align with the cutting edge of each of the other blade units in adjacent mounting cavities to form a substantially helical, stepped blade row having said substantially continuous helical cutting edge when said blade units are secured to said cutterhead body at a tilt angle between about 2 and about 20 degrees and a shear angle greater than zero to align said cutting edge of each of said blade units in said substantially continuous helical cutting edge;
   wherein said tilt angle is measured from said blade unit to an axis perpendicular to a rotational axis of said cutterhead and is inversely proportional to the diameter of said cutterhead;
   wherein said shear angle is measured from said at least one cutting edge of said blade unit to said rotational axis and is inversely proportional to an axial offset between said blade unit and an adjacent blade unit.

2. The apparatus according to claim 1, further including a fastener for removably securing each of said removable blade units in said corresponding blade unit mounting cavity.

3. The apparatus according to claim 2, wherein each of said blade unit mounting cavities include a hole to receive the fastener for removably securing the blade unit in its respective mounting cavity.

4. The apparatus according to claim 3, wherein said hole is countersunk.

5. The apparatus according to claim 4, wherein said fastener is a threaded fastener.

6. The apparatus according to claim 1, wherein each of said mounting cavities includes at least one raised portion and each of said blade units have at least three sides and at least one side that abuts the raised portion of a blade unit mounting cavity.

7. The apparatus according to claim 6, wherein said blade units have four cutting edges.

8. The apparatus according to claim 7, wherein said blade units are inverted truncated pyramids.

9. The apparatus according to claim 6, wherein the thickness of said blade units is less than about 10 mm.

10. The apparatus according to claim 6, wherein the cutting edges of said blade units have a radius between about 0 and about 250 mm.

11. The apparatus according to claim 6, wherein the cutting edge of each of said blade units is raised to facilitate jointing.

12. The apparatus according to claim 6, wherein each of said mounting cavities includes a dimple or recess and each of said blade units includes a mating dimple or recess.

13. The apparatus according to claim 1, wherein said blade units are made of materials selected from the group consisting of diamond, ceramic, carbide, high cobalt alloys, and high speed steel and mixtures thereof.

14. The apparatus according to claim 13, wherein said blade units are coated, implanted or deposited to reduce wear using techniques including growth of CVD and PVD diamond films, titanium nitride and similar coatings, and may also be hardened using heat treatments or cryogenic treatments.

15. A cutterhead body for a cutterhead for a peripheral milling machine having a plurality of blade units each having at least one cutting edge, said cutterhead body comprising:
   (a) a generally cylindrical portion; and
   (b) a plurality of circumferential, spaced and offset and overlapped blade unit mounting cavities extending into the cutterhead body from the periphery of the cylindrical portion for receiving a blade unit,
   whereby said cutting edge of each of said blade units is disposed to align with the cutting edge of each of the other blade units in adjacent mounting cavities to form a substantially helical stepped blade row having a substantially continuous helical cutting edge when said blade units are secured to said cutterhead body, and
   whereby a minimum offset to provide an overlapping corner of an adjacent blade unit cutting edge is a function of the shear angle greater than zero of the blades and a tilt angle between about 2 and about 20 degrees of the blade units whereby each helical stepped blade row makes a full cut and said cutting edge of each of said blade units align in said substantially continuous helical cutting edge;
   wherein said tilt angle is measured from said blade unit to an axis perpendicular to a rotational axis of said cutterhead and is inversely proportional to the diameter of said cutterhead;
   wherein said shear angle is measured from said at least one cutting edge of said blade unit to said rotational axis and is inversely proportional to the minimum offset.

16. The apparatus according to claim 15, wherein the minimum offset is calculated according to the function Minimum Offset equals (w')(tangent (90°−shear angle°)); where w' is the blade unit width dimension and the shear angle is the angle formed by the blade unit and the rotational axis of the cutterhead.

17. The apparatus according to claim 15, wherein the cutterhead body further includes a chip deflector adjacent to each of said mounting cavities.

18. The apparatus according to claim 15, wherein said cutterhead is made of steel, aluminum or similar materials.

19. The apparatus according to claim 15, wherein said blade unit mounting cavities extending into the cutterhead body from the periphery of the cylindrical portion for receiving a blade unit further includes a corner relief.

20. The apparatus according to claim 15, wherein said blade unit mounting cavities extending into the cutterhead body from the periphery of the cylindrical portion for receiving a blade unit further includes a tilt angle for improving the helical curve fit for a predetermined shear angle.

21. The apparatus according to claim 15, wherein said blade unit mounting cavities extending into the cutterhead body from the periphery of the cylindrical portion for receiving a blade unit further includes a roll angle for adjusting the offset for overlapping blade units.

22. A cutterhead for a peripheral milling machine, said cutterhead comprising:
   (a) a cutterhead body including (i) a generally cylindrical portion and (ii) a plurality of circumferential, spaced and offset and overlapped blade unit mounting cavities extending into the cutterhead body from the periphery of the cylindrical portion in a helical arrangement for receiving a blade unit;
   (b) a plurality of blade units each having at least one cutting edge aligning in said helical arrangement to form a substantially continuous helical cutting edge; and
   (c) means for removably securing each of said removable blade units in said corresponding blade unit mounting cavity,
   whereby said cutting edge of each of said blade units is disposed to align with the cutting edge of each of the other blade units in adjacent mounting cavities to form a substantially helical stepped blade row having said substantially continuous helical cutting edge when said blade units are secured to said cutterhead body, and
   whereby a minimum offset to provide an overlapping corner of an adjacent blade unit cutting edge is a function of the shear angle greater than zero of the blades and a tilt angle between about 2 and about 20 degrees of the blade units whereby each helical stepped blade row makes a full cut and said cutting edge of each of said blade units align in said substantially continuous helical cutting edge;
   wherein said tilt angle is measured from said blade unit to an axis perpendicular to a rotational axis of said cutterhead and is inversely proportional to the diameter of said cutterhead;
   wherein said shear angle is measured from said at least one cutting edge of said blade unit to said rotational axis and is inversely proportional to the minimum offset.

23. The apparatus according to claim 22, wherein each of said blade unit mounting cavities include a hole to receive the fastener for removably securing the blade unit in its respective mounting cavity.

24. The apparatus according to claim 23, wherein said hole is countersunk.

25. The apparatus according to claim 24, wherein said fastener is a threaded fastener.

26. The apparatus according to claim 22, wherein each of said mounting cavities includes at least one raised portion and each of said blade units have at least three sides and at least one side that abuts the raised portion of a blade unit mounting cavity.

27. The apparatus according to claim 26, wherein said blade units have four cutting edges.

28. The apparatus according to claim 27, wherein said blade units are inverted truncated pyramids.

29. The apparatus according to claim 26, wherein the thickness of said blade units is less than about 10 mm.

30. The apparatus according to claim 26, wherein the cutting edges of said blade units have a radius between about 0 and about 250 mm.

31. The apparatus according to claim 26, wherein the cutting edge of each of said blade units is raised to facilitate jointing.

32. The apparatus according to claim 26, wherein each of said mounting cavities includes a dimple or recess and each of said blade units includes a mating dimple or recess.

33. The apparatus according to claim 22, wherein said blade units are made of materials selected from the group consisting of diamond, ceramic, carbide, high cobalt alloys, and high speed steel and mixtures thereof.

34. The apparatus according to claim 33, wherein said blade units are coated, implanted or deposited to reduce wear using techniques including growth of CVD and PVD diamond films, titanium nitride and similar coatings, and may also be hardened using heat treatments or cryogenic treatments.

35. The apparatus according to claim 22, wherein the minimum offset is calculated according to the function Minimum Offset equals (w')(tangent (90°−shear angle°)); where w' is the blade unit width dimension and the shear angle is the angle formed by the blade unit and the rotational axis of the cutterhead.

36. The apparatus according to claim 22, wherein the cutterhead body further includes a chip deflector adjacent to each of said mounting cavities.

37. The apparatus according to claim 22, wherein said cutterhead is made of steel, aluminum or similar materials.

38. The apparatus according to claim 22, wherein said blade unit mounting cavities extending into the cutterhead body from the periphery of the cylindrical portion for receiving a blade unit further includes a corner relief.

39. The apparatus according to claim 22, wherein said blade unit mounting cavities extending into the cutterhead body from the periphery of the cylindrical portion for receiving a blade unit further includes a tilt angle for improving the helical curve fit for a predetermined shear angle.

40. The apparatus according to claim 22, wherein said blade unit mounting cavities extending into the cutterhead body from the periphery of the cylindrical portion for receiving a blade unit further includes a roll angle for adjusting the offset for overlapping blade units.

* * * * *